United States Patent

[11] 3,539,200

[72] Inventor Richard Chute
 Huntington Woods, Michigan
[21] Appl. No. 674,810
[22] Filed Oct. 12, 1967
[45] Patented Nov. 10, 1970
[73] Assignee Eaton Yale & Towne Inc.
 Cleveland, Ohio
 a corporation of Ohio

[54] VEHICLE SAFETY DEVICE
 17 Claims, 9 Drawing Figs.
[52] U.S. Cl. .................................................... 280/150,
 280/87
[51] Int. Cl. ...................................................... B60r 21/00
[50] Field of Search ........................................... 280/180

[56] References Cited
 UNITED STATES PATENTS
 2,899,214 8/1959 P. I. D'Antini................ 280/87
 3,411,807 11/1968 Carey et al.................... 280/150
 FOREIGN PATENTS
 609,624 9/1960 Italy ............................ 280/150
Primary Examiner—Kenneth H. Betts
Attorney—Yount, Flynn & Tarolli ABSTRACT: A safety device for protecting a driver of a vehicle comprises an inflatable confinement, a diffuser member, and a fluid reservoir all of which are supported in association with the steering wheel of the vehicle. The inflatable confinement has a contracted inoperative condition and an expanded operative condition. The confinement is inflated by the flow of fluid from the fluid reservoir through the diffuser member and into the confinement.

Patented Nov. 10, 1970

INVENTOR.
RICHARD CHUTE
BY
Yount, Raney, Flynn and Tarolli
ATTORNEYS

INVENTOR.
RICHARD CHUTE

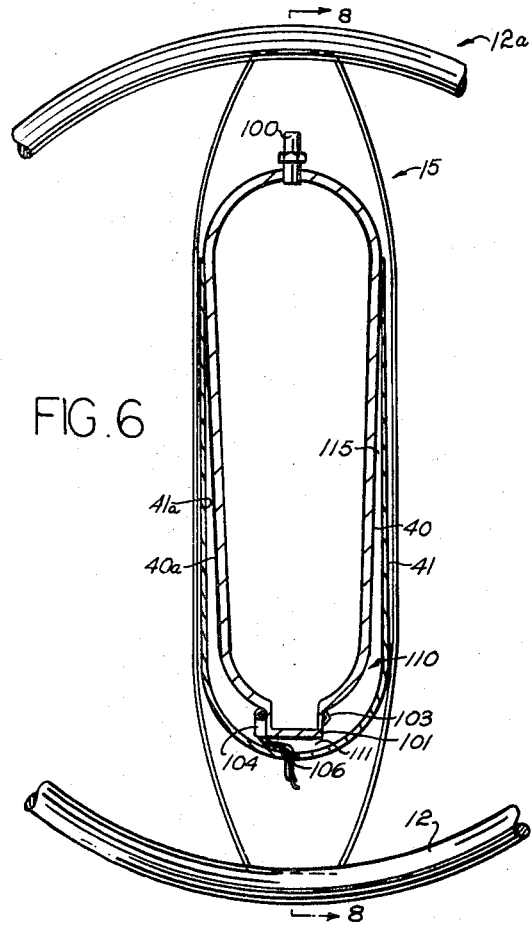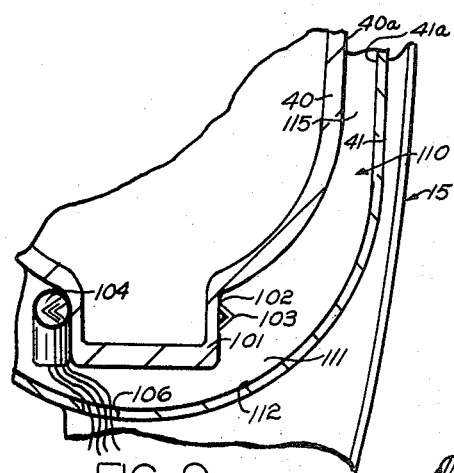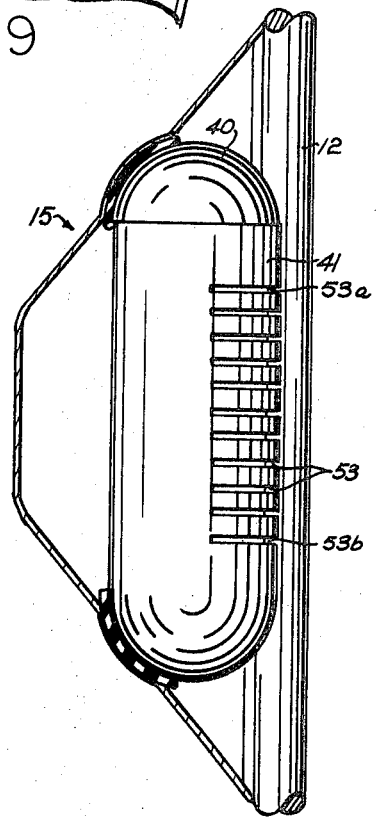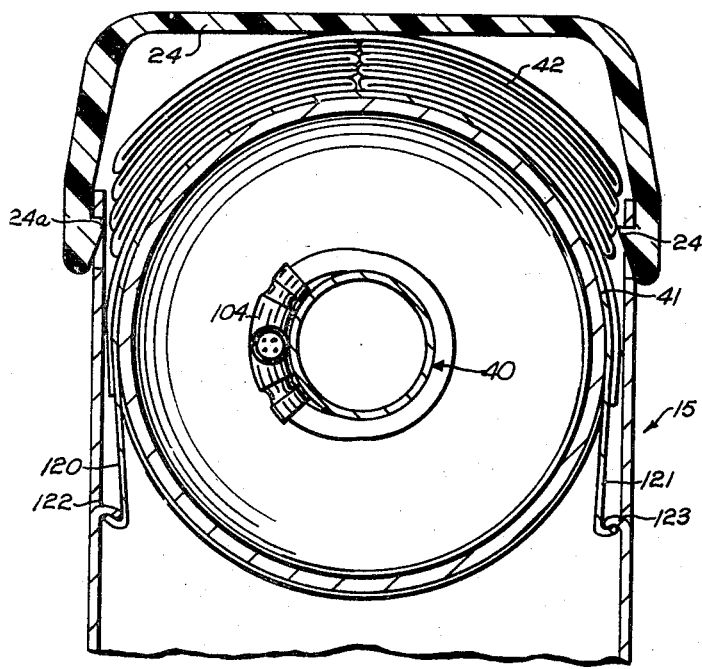

VEHICLE SAFETY DEVICE

The present invention is directed to a vehicle safety device and, particularly to a vehicle safety device which comprises an inflatable confinement which is mounted in association with the steering wheel of the vehicle and is inflated upon the vehicle encountering a collision condition.

An important object of the present invention is the provision of a new and improved safety device of a practical and reliable construction mounted in association with the steering wheel of the vehicle and operable during a collision to protect the vehicle driver from forceful impact with the steering wheel.

A further object of the present invention is the provision of a new and improved assembly which includes a vehicle-steering wheel and a confinement associated with the steering wheel and which confinement has a contracted inoperative condition located within a housing supporting the steering wheel and an expanded operative condition operable to restrain movement of an occupant of the vehicle relative to the steering wheel.

A still further object of the present invention is the provision of a new and improved assembly, as noted in the preceding paragraph, wherein the housing has a cover portion aesthetically hiding the confinement from view when the confinement is in its inoperative condition and which does not interfere with expansion of the confinement to its operative position.

Another object of the present invention is the provision of a new and improved vehicle-steering assembly including a steering wheel having a rim portion and a housing or container means interconnecting the rim of the steering wheel and the steering column and where a gas reservoir that cooperates to inflate the confinement is located in the container means.

A still further object of the present invention is the provision of a new and improved steering assembly which comprises a steering wheel and interconnecting means connecting the steering wheel to the vehicle-steering column so as to effect rotation of the steering column upon rotation of the steering wheel and wherein a fluid diffuser member is supported by the interconnecting means and is operable to diffuse the fluid as it flows from a fluid reservoir into an inflatable confinement associated with the steering wheel.

Another object of the present invention is the provision of a new and improved steering assembly construction wherein the steering wheel of the vehicle is interconnected with the steering column of the vehicle by means which supports an inflatable confinement, a fluid reservoir having a fluid supply for inflating the confinement, and a diffuser member which diffuses the fluid as it flows into the confinement and all which rotate with the steering wheel upon rotation thereof.

Further objects and advantages of the present invention will be apparent to those skilled in the art to which it relates from the following detailed description of a preferred embodiment thereof made with reference to the accompanying drawing and wherein:

FIG. 6 is a fragmentary view, similar to FIG. 2, of a modified embodiment of the present invention;

FIG. 7 is a sectional view of FIG. 6;

FIG. 8 is a sectional view with parts in elevation taken approximately along section line 8–8 of FIG. 6; and FIG. 9 is an enlarged view of a portion of FIG. 6.

The present invention provides an improved safety device of a practical construction and which includes an inflatable confinement operable to protect an occupant of a vehicle during a collision. The safety device is associated with the steering wheel of the vehicle, and with the steering wheel provides an improved steering assembly. The steering assembly may be utilized by different types of vehicles, and is not limited to use in any particular type of vehicle.

Figure 1:
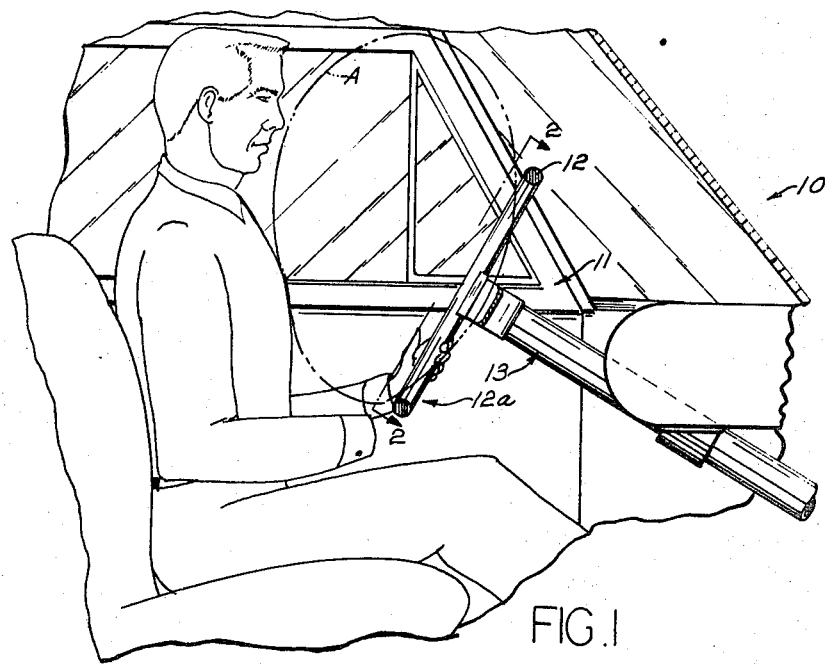
FIG. 1 is a schematic fragmentary view illustrating a vehicle embodying the present invention.

As representing the preferred embodiment of the present invention, FIG. 1 illustrates a vehicle 10 having a steering assembly, generally designated 11. The steering assembly 11 includes a steering wheel 12a having a rim portion 12 and a steering column 13 which rotates upon rotation of the steering wheel 12a. The steering wheel 12a is adapted to be gripped by the operator of the vehicle and rotated so as to effect rotation of the steering column 13 to effect directional control over the vehicle.

Figure 2:
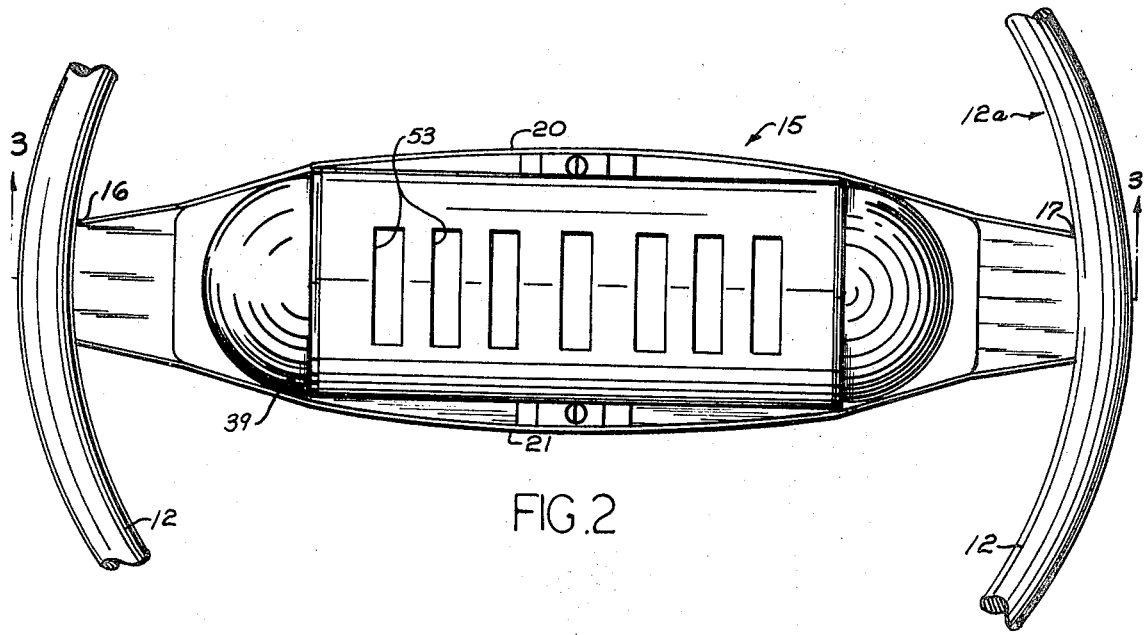
FIG. 2 is a fragmentary view looking at FIG. 1 along the line 2–2 thereof.
Figure 3:
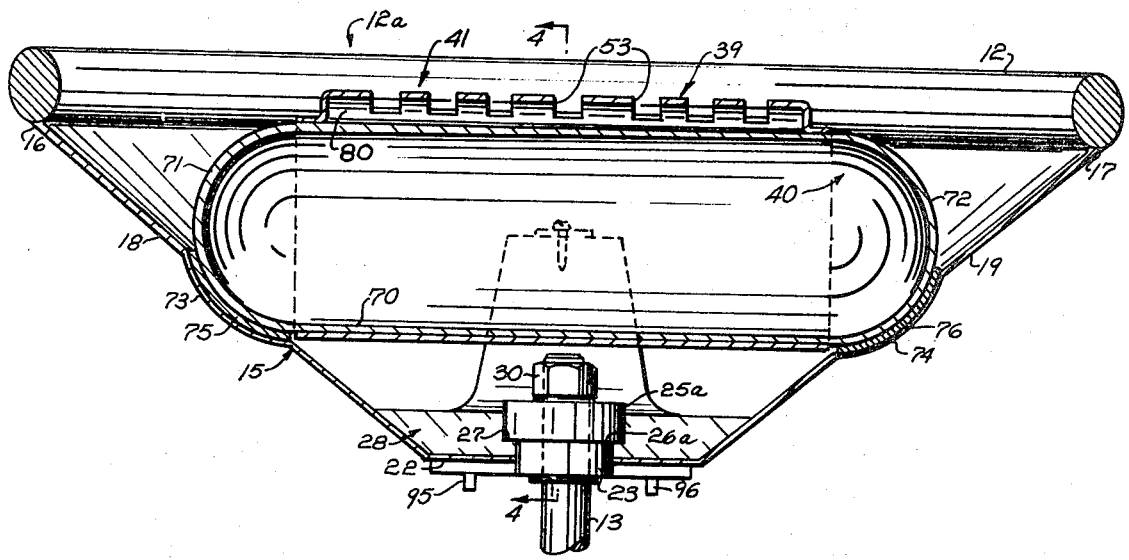
FIG. 3 is a sectional view, taken approximately along the section line 3–3 of FIG. 2.

The rim 12 of the steering wheel 12a is connected with the steering column 13 to effect rotation of the steering column 13 upon rotation of the steering wheel 12a by interconnecting means, generally designated 15. The interconnecting means 15 is in the form of a housing or container having upper edge portions 16, 17 of end walls 18, 19 respectively. The edge portions 16, 17 are connected in a suitable manner with the rim 12 of the steering wheel 12a to rotate with the rim 12. The end walls 18, 19 preferably as indicated in FIG. 3, taper downwardly and inwardly as they extend from the rim 12 toward the steering column 13. The end walls 18, 19 of the container are connected by, what may be termed, sidewalls 20, 21 of the housing or container means 15 illustrated in FIG. 2. The sidewalls 20, 21 are generally trapezoidal in shape, as best shown in FIG. 3.

The housing or container means 15 also has a bottom wall 22 having an opening 23 through which the steering column 13 extends. The housing or container means 15 also includes a cover member 24 which closes the upper end of the container means 15 and hides the interior of the container means 15 from view. The cover member 24 may be a decorative cover and has opposite portions 25, 26 which snap over opposite edges of the walls 20, 21 of the container means 15 to provide the cover thereof.

A sleeve member 25a encircles the end of the steering column 13 in the housing or container means 15. The sleeve member 25a has a shoulder portion 26a which engages a ledge 27 of a hub member 28. The hub member 28 is supported in the container means 15 primarily by the bottom wall 22 thereof. A suitable nut member, or fastener, 30 is threaded onto the end of the threaded end of the steering column and effects a clamping connection of the sleeve 23, hub member 28, and steering column 13. The clamping connection is such that upon rotation of the steering wheel 12a, the steering column 13 is rotated.

Figures 4, 5:
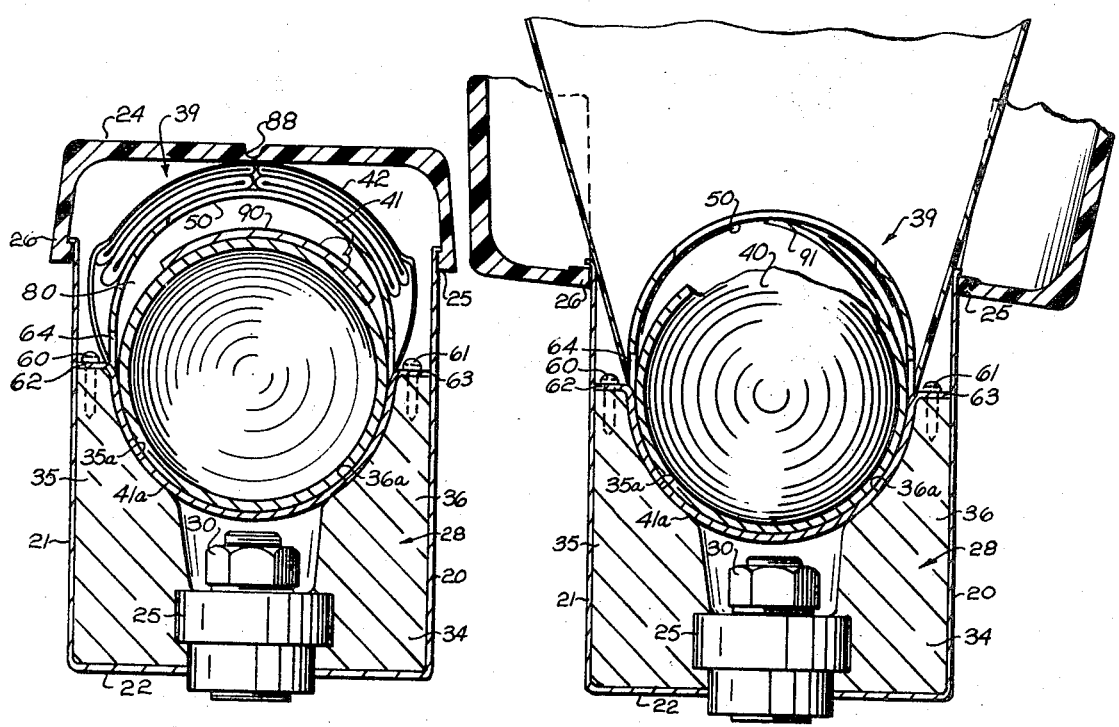
FIG. 4 is a sectional view taken approximately along the section line 4–4 of FIG. 3.
FIG. 5 is a sectional view, similar to FIG. 4 but showing parts in different condition.

The hub member 28 has a base portion 34, against which the fastener 30 bears, and a pair of projections 35, 36 best shown in FIG. 4 which project upwardly from the base portion 34. The projections 35, 36 have annular support surfaces 35a, 36a, respectively. The annular support surfaces 35a, 36a, provide a generally U-shaped support within the container means 15, for a purpose to be described hereinbelow.

From the above, it should be apparent that the steering wheel 12a is supported by the housing or container means 15, and that the housing or container means 15 transmits the rotation of the steering wheel 12a to the steering column 13. Moreover, it should be clear that the interior of the container means 15 is hidden from view and anything located in the container means would likewise be hidden from view.

The steering assembly 11 includes a safety device 39 supported within the housing or container, means 15. The safety device 39 operates to protect the driver of the vehicle from forceful impact with the steering wheel during a collision. The safety device 39 includes in general a fluid reservoir 40, a diffuser member 41, and an inflatable confinement 42. The inflatable confinement 42 has a contracted inoperative condition, shown in FIG. 4, and an inflated operative position shown in FIG. 5. The confinement 42 is inflated from its contracted condition by the flow of fluid into the confinement 42 from the reservoir 40. When the fluid flows into the confinement 42, it is inflated and takes a position, such as shown in dotted lines in FIG. 1, and designated A. In such an inflated condition, the confinement restrains and controls movement of the occupant of the vehicle relative to the steering wheel or steering column of the vehicle and thereby protects the occupant from forceful impact with the steering column or steering wheel of the vehicle.

The diffuser member 41 is associated with the inflatable confinement 42 in such a manner that the confinement 42 as best shown in FIG. 4 when in a contracted condition, lies in a folded condition upon the outer portion 50 of the diffuser member 41. The diffuser member 41 is provided with a plurality of slots or other openings 53 to effect a spreading or uniform flow of fluid from the reservoir 40 into the confinement 42 in order to effect a relatively uniform inflation of the confinement 42.

The diffuser member 41 is a generally cylindrical member and has a cylindrical portion 41a which engages the surfaces 35a, 36a of the members 35, 36, respectively, and the diffuser member 41 is thus supported thereby. The diffuser member 41 is secured in the position illustrated within the container means 15 by suitable screw fasteners 60, 61, respectively. The fasteners 60, 61 extend through tab portions 62, 63, respectively, projecting from the diffuser member 41. The tab portions 62, 63 are provided by punching openings 64, 65, respectively, in opposite portions of the diffuser member. The projecting tabs 62, 63 as illustrated extend in overlying engagement with the upper surface portions of the projecting members 35, 36, respectively, and the screw fasteners 60, 61 extend through openings in the tab portions 62, 63, respectively, and into the projecting portions 35, 36 of the hub member 28. In this manner, the diffuser member 41 is securely held in position on the hub member 28 within the container means 15 and is thus rotated upon rotation of the steering wheel 12a.

The fluid reservoir 40 contains a supply of fluid under pressure, as noted hereinabove, which is released to effect inflation of the inflatable confinement 42. The fluid reservoir 40 is of a generally cylindrical shape having a central cylindrical-shaped portion 70 which is closed by opposite semispherical end portions 71, 72. The semispherical end portions 71, 72 are cradled and supported in opposite portions 73, 74 of the end walls 18, 19 respectively. Suitable cushioning pads 75, 76 are interposed between the wall portions 73, 74 and the semispherical portions 71, 72 respectively in order to properly support and cushion the fluid reservoir 40 in the container means 15.

The fluid reservoir 40 is located in part in a chamber defined by the diffuser member 41, and may be suitably secured to the diffuser member 41. The diffuser member 41 has its lower portion secured tightly in engagement with the cylindrical portion 70 of the fluid reservoir 40 and which portion extends around the fluid reservoir 40. The upper portion of the diffuser member, as shown in FIG. 3, is spaced from the upper wall portion of the reservoir 40 to provide a chamber 80 therebetween.

Upon opening of the fluid reservoir 40, fluid flows from the fluid reservoir 41 into chamber 80 and through the slots 53 in the diffuser member 41 and into the contracted confinement 42. Upon fluid flowing into the confinement 42, the confinement 42 expands to the condition shown in FIG. 1. As the confinement expands, the confinement causes the cover member 24 to release so that the cover 24 does not interfere with expansion of the confinement 42. The cover member 24 may have central weakened area 88 which is broken upon inflation of the confinement 42 by the flow of gas from the fluid reservoir 40.

The fluid reservoir 40 is opened to provide for the flow of fluid therefrom by any suitable means. Preferably the means for opening the reservoir for effecting the flow of fluid therefrom is in the form of an explosive, generally designated 90. The explosive may be in a strip form and attached to an area of the reservoir 40 which is weakened so that upon actuation of the explosive the area will open and move outwardly in response to the rush or pressure of the fluid thereon from the reservoir. Such an area of the reservoir 40 is illustrated in FIG. 5 and designated 91. When the portion 91 is moved to the position illustrated in FIG. 5, fluid rushes from the fluid reservoir 40 through the diffuser member 41 and into the confinement 42 to effect an inflation of the confinement 42 as described hereinabove.

The explosive 90 is ignited to effect inflation of the confinement 42 by the flow of an electrical current through the explosive. The electrical current may flow through the explosive 90 upon completion of a circuit which is closed in response to the vehicle encountering a collision condition. Suitable sensing means may be utilized in the circuit in order to sense a collision condition and effect a completion of the circuit for igniting the explosive 90. A suitable slip ring arrangement, generally designated 95, and shown in FIG. 3, is utilized to provide for the current flow to the explosive 90. The slip ring arrangement 95, includes a rotatable contact 96 carried on the steering wheel and which rotates with the steering wheel assembly 12a and a second contact member which is maintained in contact with the contact member 96, even though the contacts rotate relative to each other.

In view of the foregoing, it should be apparent that applicant has provided an improved, simple and practical design for a steering assembly and a safety device which may form a part of the steering assembly. The safety device is operable in a situation wherein the vehicle encounters a collision condition, to expand the inflatable confinement 42 in order to protect the occupant of the vehicle from harmful impact with the steering wheel 12a during the collision.

Another embodiment of the present invention is illustrated in FIGS. 6—9. The embodiment of the invention shown in FIGS. 6—8 incorporates many parts which are similar to parts described hereinabove in connection with FIGS. 1—5. The parts which are similar are given the same reference numerals in FIGS. 6—9 as they were given in FIGS. 1—5.

In the embodiment illustrated in FIGS. 6—9, a steering wheel 12a having a rim portion 12 is interconnected with the steering column by an interconnecting means which is in the form of a container 15. Located within the container 15 and supported thereby is a fluid reservoir 40 and a diffuser member 41 associated with the reservoir and, in part, encircling the reservoir 40. A confinement 42 is associated with the reservoir 40 and diffuser member 41 so as to be inflated by the flow of fluid from the reservoir 40. The flow of fluid flows from the reservoir 40 through suitable openings 53 in the diffuser member 41 and into the confinement 42 to effect inflation of the confinement 42.

The reservoir 40 is provided with a fill connection 100 at one end thereof through which the reservoir 40 is filled with fluid. The reservoir 40 at the other end thereof has a neck-down portion 101. The neck-down portion 101 includes a projecting surface portion 102 which projects outwardly from the spherical body of the reservoir member 40. A linear-shaped strip of explosive material 103 encircles the projecting portion 101 of the reservoir 40 in order to effect the formation of an opening in the reservoir 40 upon detonation thereof. The explosive strip 103 extends around the surface 102 of the projecting portion 101 of the reservoir 40 and is ignited by the passage of a current through a detonator 104. A current is directed through the detonator 104 by lead wires or conductors 105 which extend through an opening 106 in the diffuser member 41.

As fluid flows from the reservoir 40, it flows into a chamber, generally designated 110, which is defined by the outer peripheral surface of the reservoir 40 and the inner peripheral surface of the diffuser member 41. The chamber 110 includes a chamber portion 111 adjacent the projecting portion 101 of the reservoir 40 and into which the fluid from the reservoir 40 initially flows upon detonation of the explosive strip 103. The fluid which flows into the chamber portion 111 is directed by the internal spherical surface 112 of the diffuser member, which defines, in part, the chamber portion 111, along the extend of the reservoir 40.

The chamber 110 also includes a generally tapered chamber portion 115 which extends from the chamber portion 111 and which is defined by the outer surface 40a of the reservoir 40 and the inner surface 41a of the diffuser member 41. The chamber 115 is tapered to such an extend that as the fluid flows along the chamber portion 115, it is somewhat compressed. The taper of the chamber 115 is due to the fact that the reservoir 40 is tapered, while the diffuser member 41 is not as shown in FIG. 6. The tapered chamber 115 could be provided by other construction.

The fluid flows into the chamber portion 115 and then flows through the openings 53 in the diffuser member 41 and into the confinement 42. The tapered chamber portions 115 provide for substantially the same amount of fluid flow through all the openings 53. There is approximately the same flow rate through opening 53a which is located farthest from the explosive 103 as there is through opening 53b which is located immediately adjacent the strip 103. Moreover, the flow of fluid through each of the openings is maintained substantially equal for a time interval so as to provide for a uniform inflation of the confinement.

A cover member 24 closes the container 15, and is secured in position on the container 15 by means of lug portions 24a, 24b, respectively, which project through openings in the container or interconnecting means 15, as shown in FIG. 7. Moreover, the diffuser member 41 is secured in position in the container means 15 by projecting lug portions 120, 121 which cooperate with projecting tabs 122 and 123, respectively, on the container means 15.

In view of the foregoing, it should be apparent that applicant has provided a new and improved steering assembly for a vehicle and that certain changes, modifications, and adaptations may be made therein, and it is intended to cover all such changes, modifications, and adaptations therein which come within the scope of the appended claims.

I claim:

1. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement in said collapsed condition having a relatively narrow crosswise dimension and a relatively long lengthwise dimension with a longitudinal axis of the confinement extending transversely to a central axis of rotation of the steering wheel, said confinement when in said expanded condition being operable to restrain movement of the driver of the vehicle relative to the steering wheel, and housing means for enclosing said confinement when said confinement is in said collapsed condition, said housing means including a pair of spaced-apart sidewalls which extend lengthwise of said confinement when said confinement is in said collapsed condition, a pair of spaced-apart end walls which are shorter than said sidewalls and extend between said sidewalls, and an upper wall extending lengthwise between said end walls and crosswise between said sidewalls, said upper wall being movable relative to said side and end walls upon expansion of said confinement to enable said confinement to expand to said expanded condition.

2. Safety apparatus as set forth in claim 1 wherein said housing means further includes a bottom wall extending between said sidewalls and said end walls, said bottom wall connecting the steering wheel with a vehicle steering shaft to effect rotation of the steering shaft upon rotation of the steering wheel.

3. Safety apparatus for protecting an occupant of a vehicle during an accident, said safety apparatus comprising a confinement means expandable from a collapsed condition to an expanded condition for restraining movement of an occupant of the vehicle during an accident, means providing a source of fluid for effecting expansion of said confinement means, and housing means for completely enclosing said confinement means when said confinement means is in the collapsed condition, said housing means including a relatively weak connection means for dividing said housing means into a plurality of sections and for breaking under the influence of said confinement means upon initial expansion of said confinement means to thereby separate said sections with at least one of said separated sections being moved relative to another of said sections to facilitate further expansion of said confinement means to said expanded condition.

4. Safety apparatus as set forth in claim 3 wherein said connection means is formed by an elongated preweakened area of said housing means.

5. Safety apparatus as set forth in claim 4 wherein said elongated preweakened area of said housing means includes an area having a relatively small cross-sectional area compared to the cross section area of said sections.

6. Safety apparatus as set forth in claim 3 wherein said source of fluid is located within said housing means and said housing means is adapted to be mounted on the steering wheel of a vehicle.

7. Safety apparatus as set forth in claim 3 wherein said housing means includes a base and connection means for securing said sections to said base, said connection means including means for enabling said sections to pivot relative to said base upon a breaking of said connection means under the influence of said confinement means.

8. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement when in said expanded condition being operable to restrain movement of the driver of the vehicle relative to the steering wheel, housing means for connecting the steering wheel to a vehicle-steering shaft to effect rotation of the steering shaft upon rotation of the steering wheel, said housing means completely enclosing said confinement when said confinement is in said collapsed condition and having a portion which is movable upon expansion of said confinement to enable said confinement to expand to said expanded condition, a source of fluid within said housing means for providing fluid flow to effect expansion of said confinement, and a diffuser member located within said housing means in the path of fluid flow to effect diffusion of the fluid as it flows from said source of fluid into said confinement, said diffuser member comprising an elongate member located between opposite portions of said steering wheel and extending a substantial distance therebetween.

9. Safety apparatus as set forth in claim 8 wherein said housing means includes cover means for protecting said confinement in the collapsed condition and for providing the aforesaid portion which is movable upon expansion of said confinement.

10. Safety apparatus as set forth in claim 8 wherein said housing means includes a part which releases in response to expansion of said confinement to thereby enable the aforesaid movable portion of said housing means to be moved under the influence of said confinement so that said housing means does not interfere substantially with expansion of said confinement.

11. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement when in said expanded condition being operable to restrain movement of the driver of the vehicle relative to the steering wheel, housing means for connecting the steering wheel to a vehicle-steering shaft to effect rotation of the steering shaft upon rotation of the steering wheel, said housing means completely enclosing said confinement when said confinement is in said collapsed condition and having a portion which is movable upon expansion of said confinement to enable said confinement to expand to said expanded condition, a source of fluid within said housing means for providing fluid flow to effect expansion of said confinement, said source of fluid including an elongated fluid reservoir having its longitudinal axis extending transversely to the longitudinal axis of the steering shaft, and a diffuser member located within said housing means in the path of fluid flow to effect diffusion of the fluid as it flows from said source of fluid into said confinement, said diffuser member extending at least partially around said fluid reservoir and defining a plurality of slots through which fluid from said fluid reservoir flows to effect expansion of said confinement.

12. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement when in said expanded condition being operable to restrain movement of the driver of the vehicle relative to the steering wheel, and housing means for connecting the steering wheel to a vehicle-steering shaft to effect rotation of the steering shaft upon rotation of the steering wheel, said housing means completely enclosing said confinement when said confinement is in said collapsed condition and having a portion which is movable upon expansion of said confinement to enable said confinement to expand to said expanded condition, said housing means including an elongated preweakened area which divides said housing means into a plurality of sections, said preweakened area of said housing means being broken under the influence of said confinement upon expansion of said confinement to thereby separate said sections to form the aforesaid portion which is movable upon expansion of said confinement.

13. Safety apparatus as set forth in claim 12 further including a source of fluid within said housing means for providing fluid flow to effect expansion of said confinement, and a diffuser member located within said housing means in the path of fluid flow to effect diffusion of the fluid as it flows from said source of fluid into said confinement.

14. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement when in said expanded condition being operable to restrain movement of the driver of the vehicle relative to the steering wheel, and housing means for connecting the steering wheel to a vehicle-steering shaft to effect rotation of the steering shaft upon rotation of the steering wheel, said housing means completely enclosing said confinement when said confinement is in said collapsed condition and having a portion which is movable upon expansion of said confinement to enable said confinement to expand to said expanded condition, said housing means including cover means for protecting said confinement in the collapsed condition and for providing the aforesaid portion which is movable upon expansion of said confinement, said cover means including a plurality of sections interconnected by a relatively weak connection, said connection being breakable under the influence of said confinement upon expansion of said confinement to thereby separate said sections to form the aforesaid portion which is movable upon expansion of said confinement.

15. Safety apparatus as set forth in claim 14 wherein said relatively weak connection is formed by a portion of said cover having a relatively small cross-sectional area compared to the cross-sectional area of said sections which are interconnected by said relatively weak connection.

16. Safety apparatus adapted to be mounted on the steering wheel of a vehicle to protect the driver of the vehicle during an accident, said safety apparatus comprising a confinement associated with the steering wheel and having a collapsed condition and an expanded condition, said confinement when in said expanded condition being operable to restrain movement of the driver of the vehicle relative to the steering wheel-housing means for connecting the steering wheel to a vehicle-steering shaft to effect rotation of the steering shaft upon rotation of the steering wheel, said housing means completely enclosing said confinement when said confinement is in said collapsed condition and having a portion which is movable upon expansion of said confinement to enable said confinement to expand to said expanded condition, a source of fluid mounted in said housing means, and a diffuser member at least partially enclosing said source of fluid and having a plurality of openings for directing fluid flow into said confinement, said diffuser member and said source of fluid having surfaces thereon which cooperate to form a tapered cavity having surfaces thereon operable to direct the flow of fluid from said source of fluid to provide a substantially equal fluid flow through each of said openings.

17. Apparatus to be associated with the steering wheel and steering shaft of a vehicle, said apparatus comprising a support means for connection with the steering shaft and supporting the steering wheel of the vehicle, and expansible confinement supported by said support means and having a collapsed condition and an expanded condition, said confinement when in said expanded condition being operable to restrain movement of an occupant of the vehicle relative to said steering wheel, said support means including a housing means having a closed condition completely enclosing said confinement when said confinement is in said collapsed condition to thereby protect said confinement and an open condition-facilitating expansion of said confinement, a diffuser member associated with said confinement and supported in said housing means by said support means, a source of fluid located in said housing means and operatively associated with said diffuser member, means associated with said source of fluid for activating said source of fluid to effect flow of fluid therefrom, said diffuser member being operable to direct the flow of fluid from said source of fluid to said confinement and having passages therethrough through which the fluid flows prior to flowing into said confinement to effect expansion of said confinement, said housing means being operable from said closed condition to said open condition under the influence of fluid pressure within said confinement upon initiation of expansion of said confinement by the fluid from said source of fluid and including a preweakened portion which is broken by expansion of said confinement.